(No Model.) 8 Sheets—Sheet 1.
F. J. SPRAGUE.
ELECTRO DYNAMIC MOTOR.
No. 315,180. Patented Apr. 7, 1885.
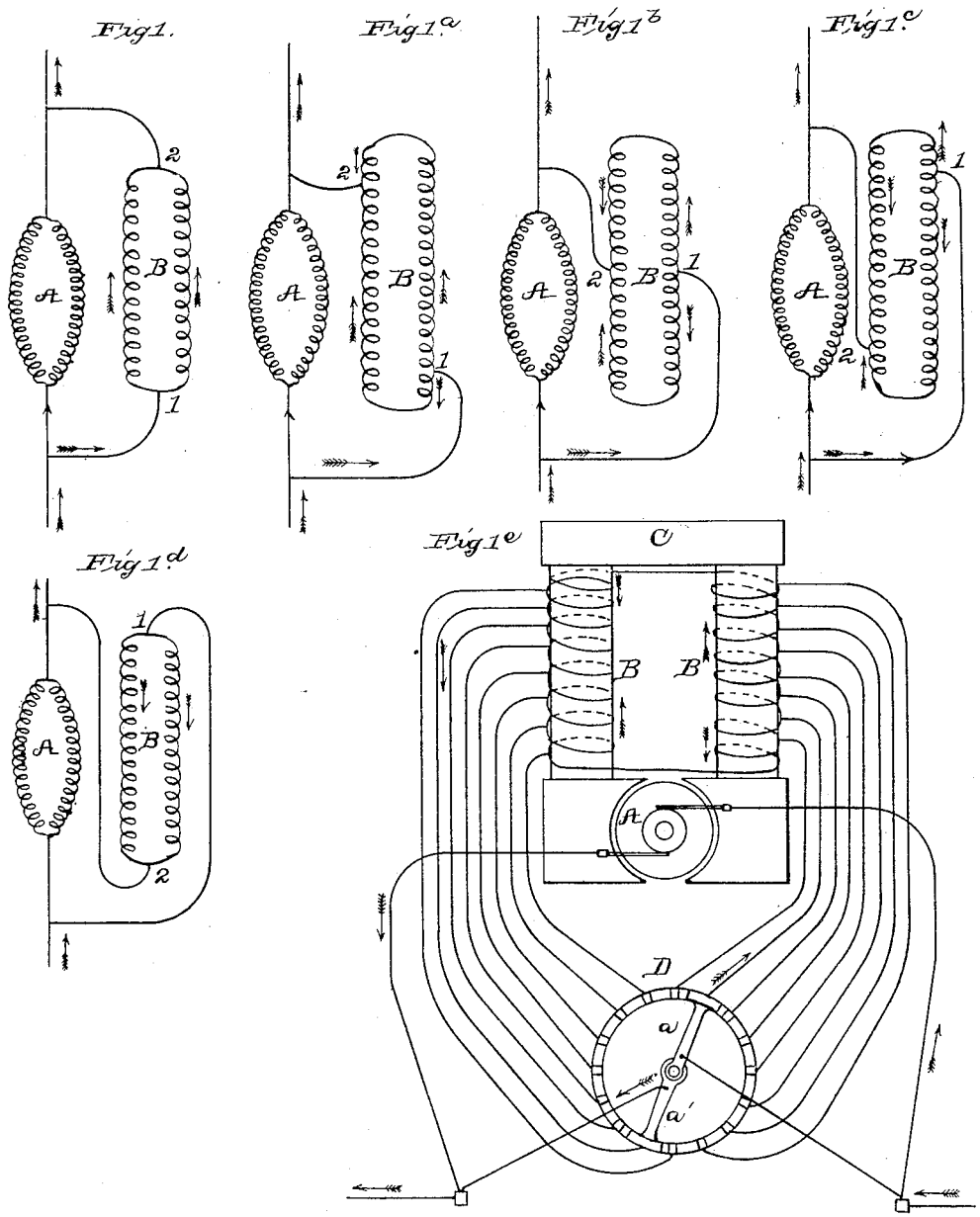
ATTEST:
E. C. Rowland
T. G. Greene Jr.
INVENTOR:
Frank J. Sprague
By Dyer & Lacey
Attys (No Model.)  
8 Sheets—Sheet 2.
F. J. SPRAGUE.
ELECTRO DYNAMIC MOTOR.
No. 315,180.  
Patented Apr. 7, 1885.
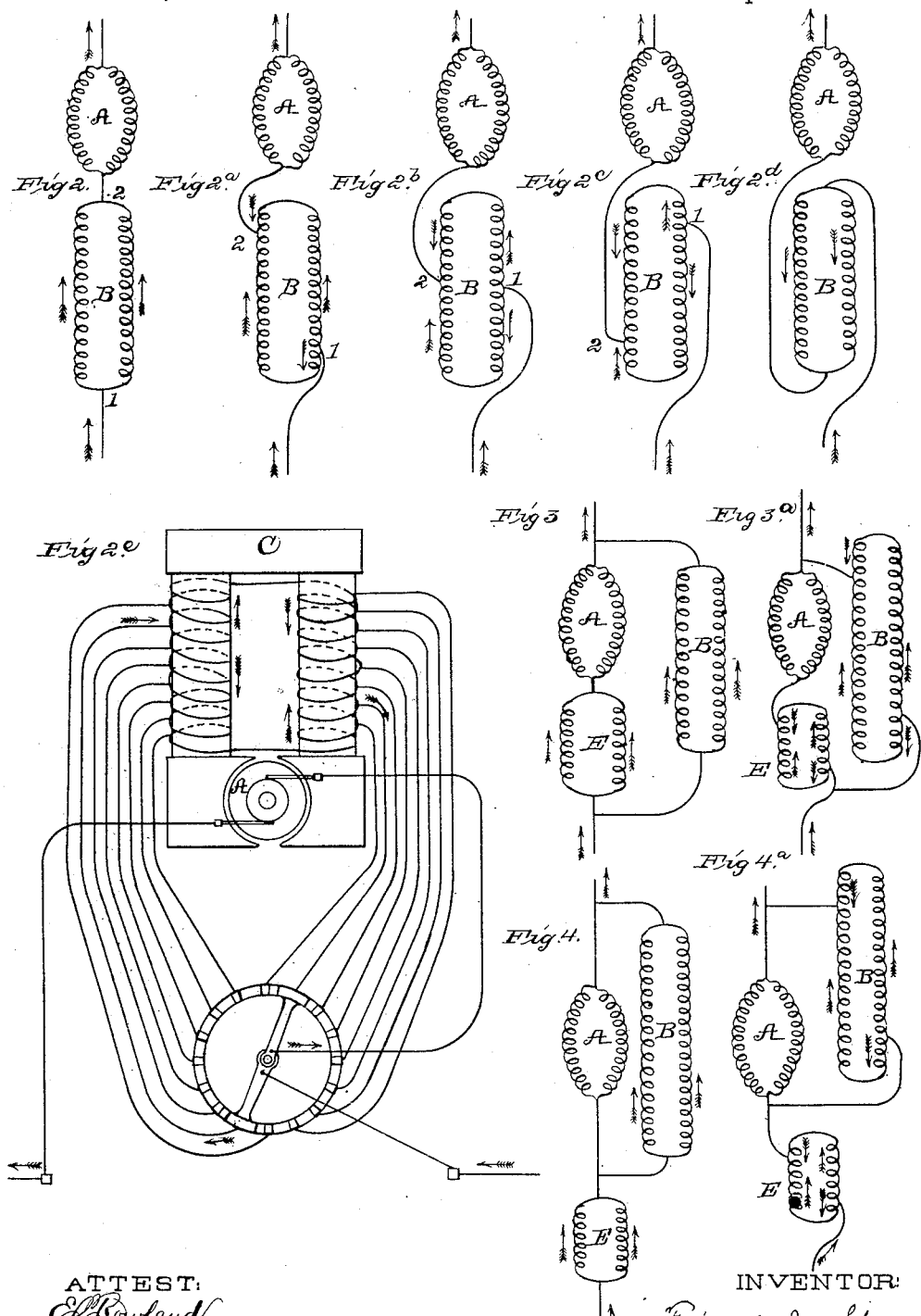
ATTEST:  
E. Rowland  
T. G. Greene Jr.
INVENTOR:  
Frank J. Sprague  
By Dyer & Seely  
Attys (No Model.) 8 Sheets—Sheet 3.
F. J. SPRAGUE.
ELECTRO DYNAMIC MOTOR.
No. 315,180. Patented Apr. 7, 1885.
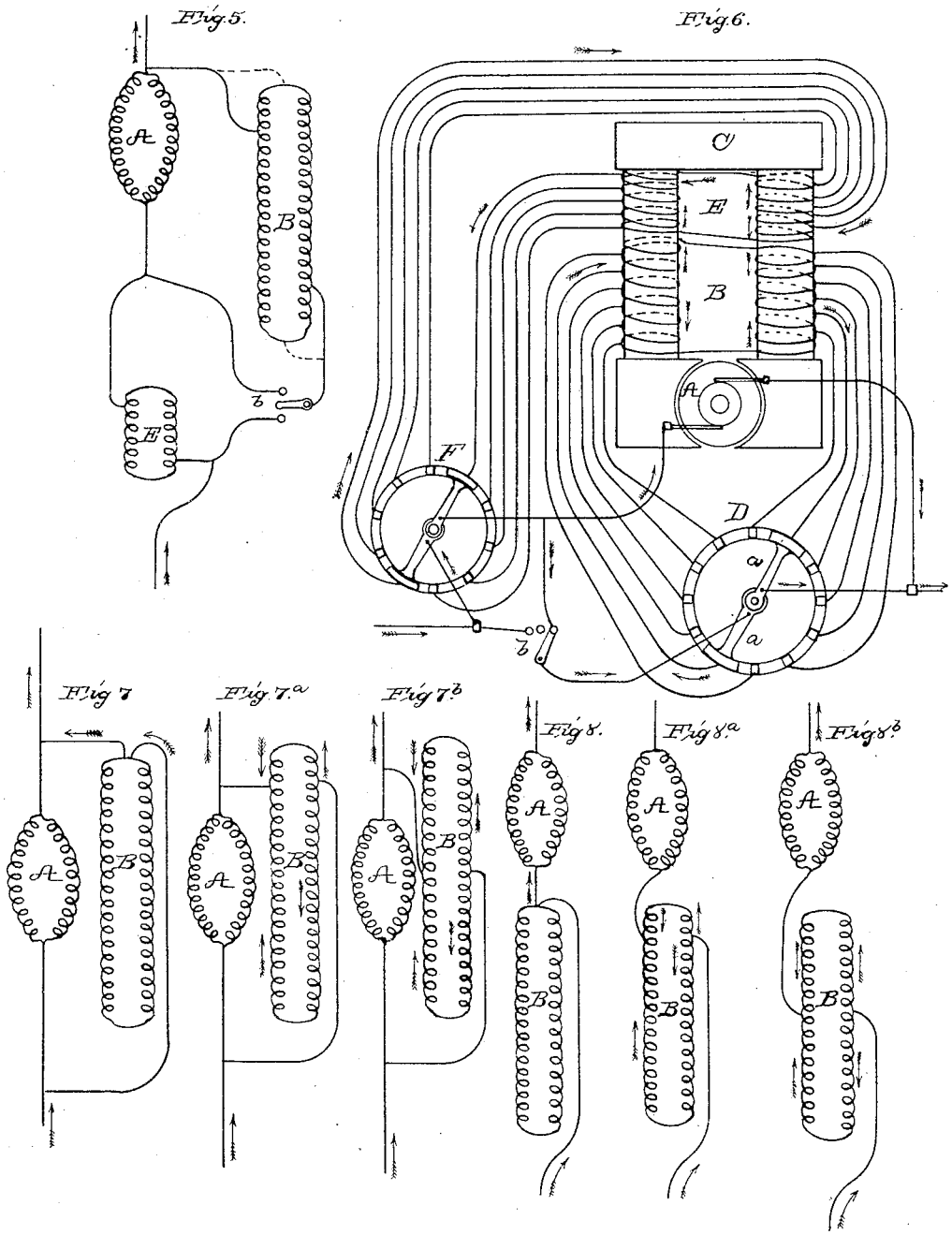

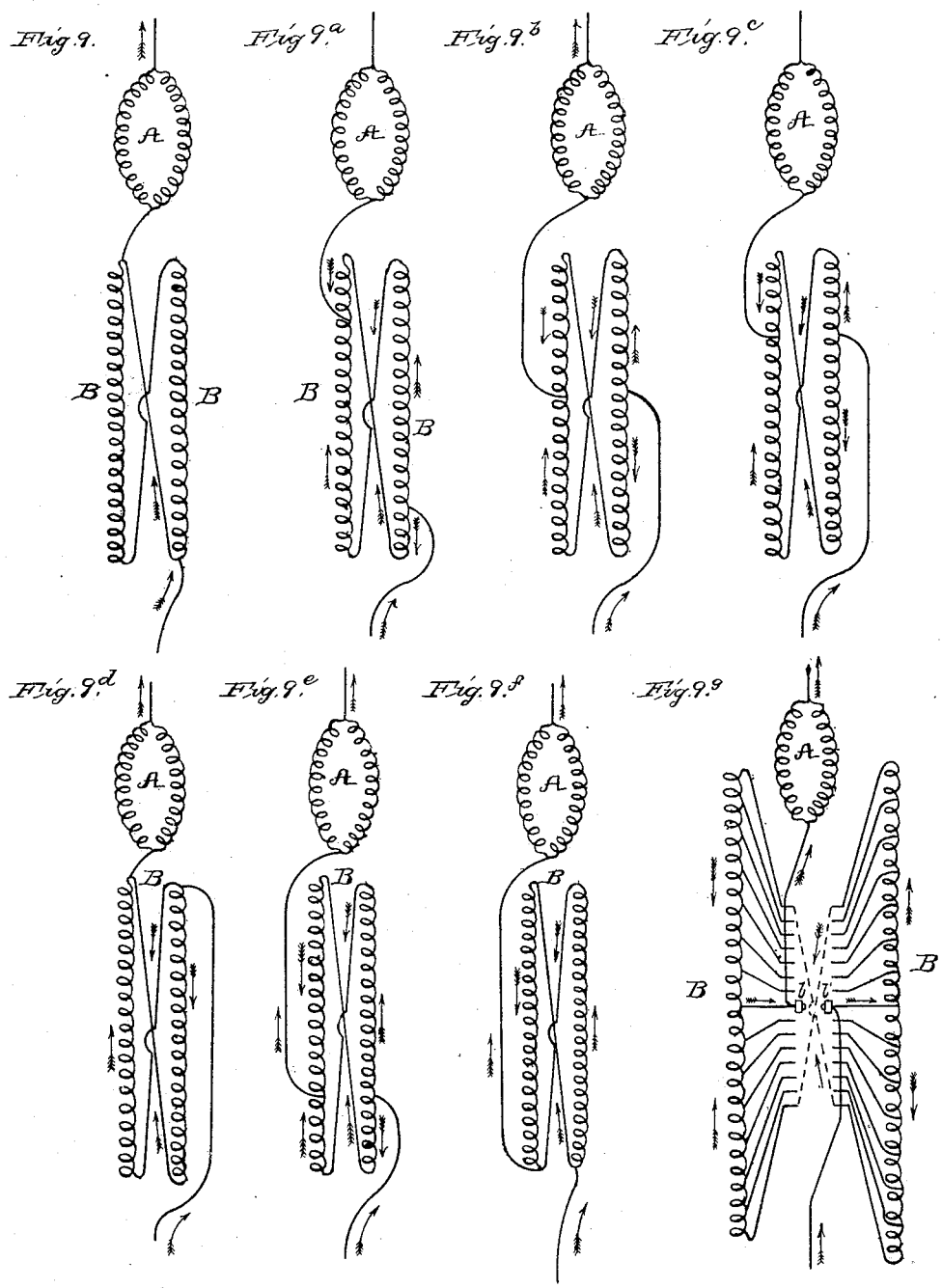

(No Model.)  
8 Sheets—Sheet 5.
F. J. SPRAGUE.
ELECTRO DYNAMIC MOTOR.
No. 315,180. Patented Apr. 7, 1885.
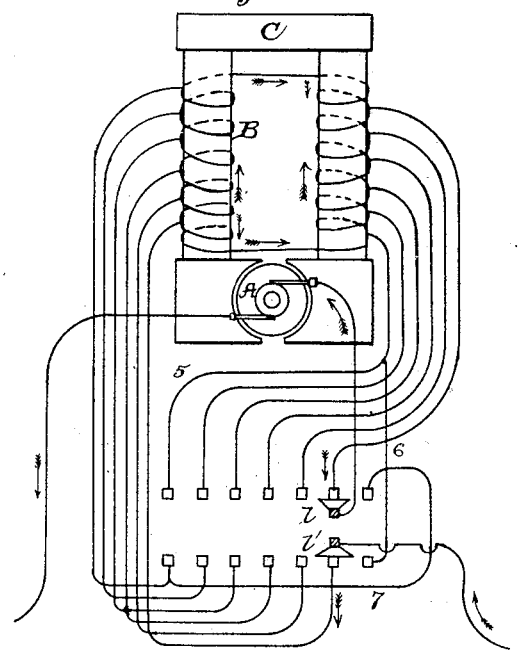
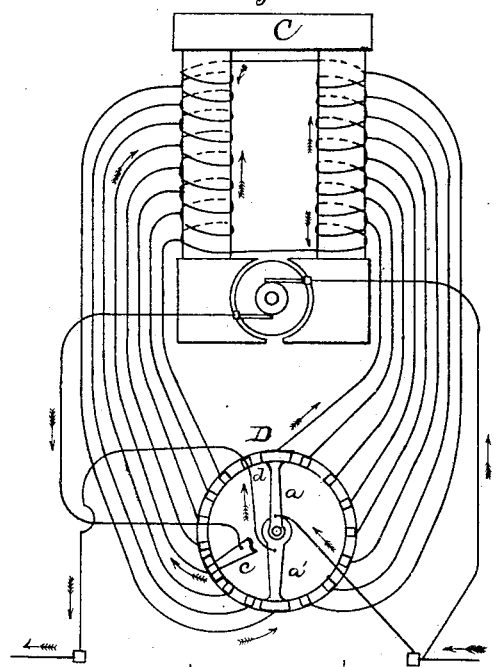
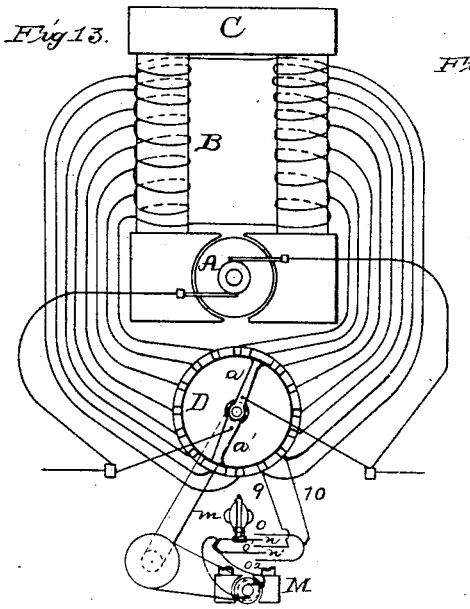
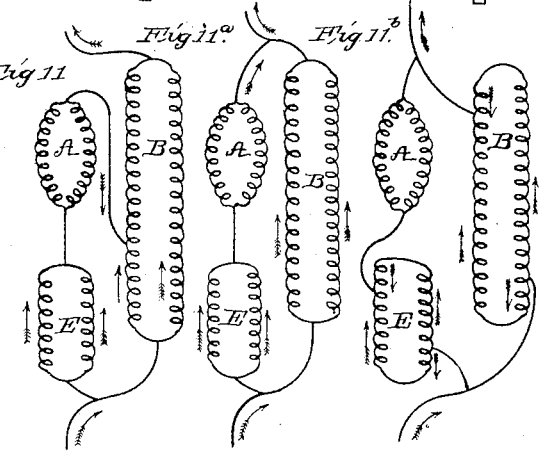
ATTEST  
E. C. Rowland  
T. G. Greene Jr.
INVENTOR:  
Frank J. Sprague  
By Dyer & Seely  
Attys (No Model.)
F. J. SPRAGUE.
ELECTRO DYNAMIC MOTOR.
No. 315,180. Patented Apr. 7, 1885.
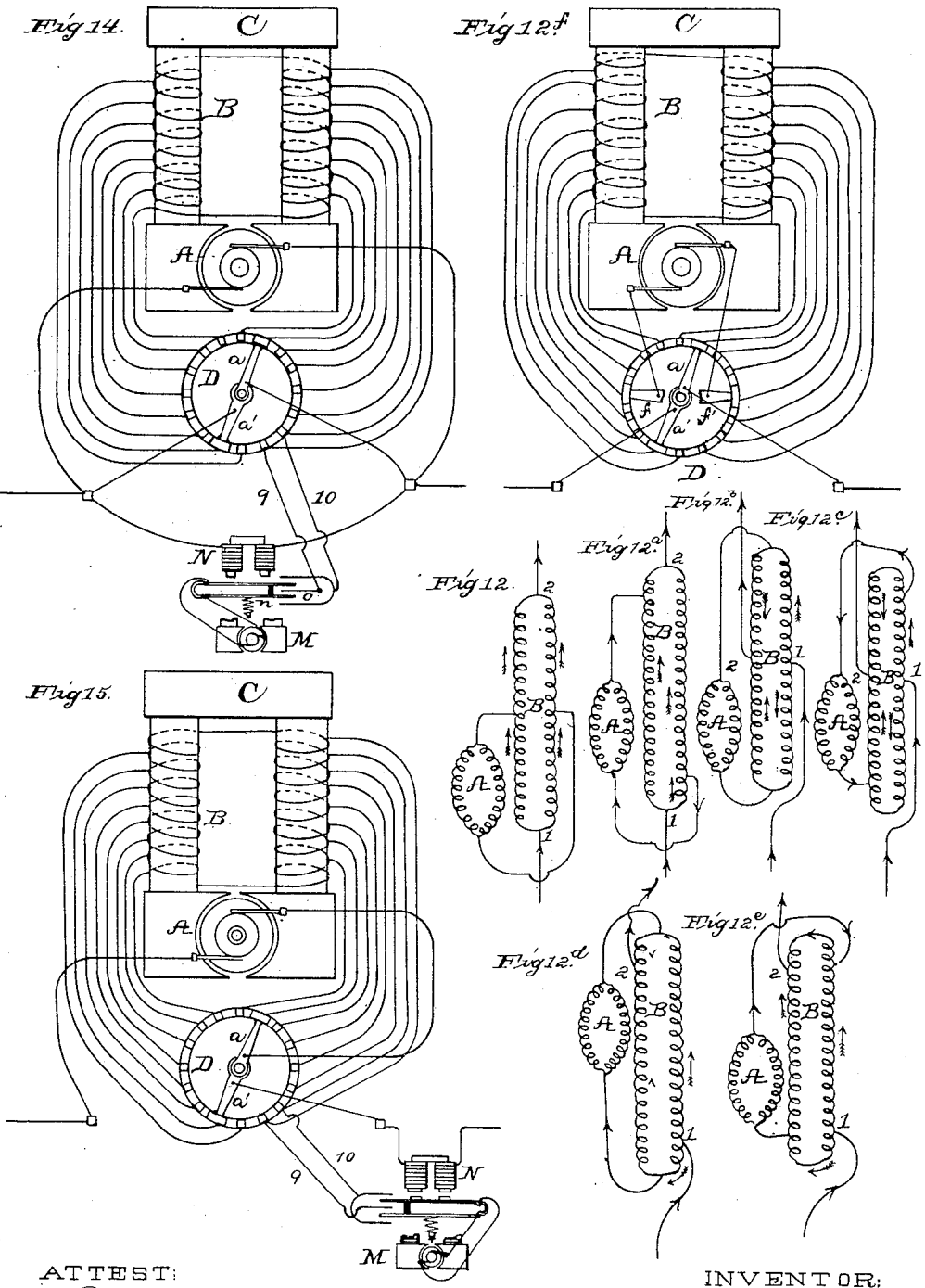
ATTEST:
E. C. Rowland
T. G. Greene Jr.
INVENTOR:
Frank J. Sprague
By Dyer & Seely
Attys

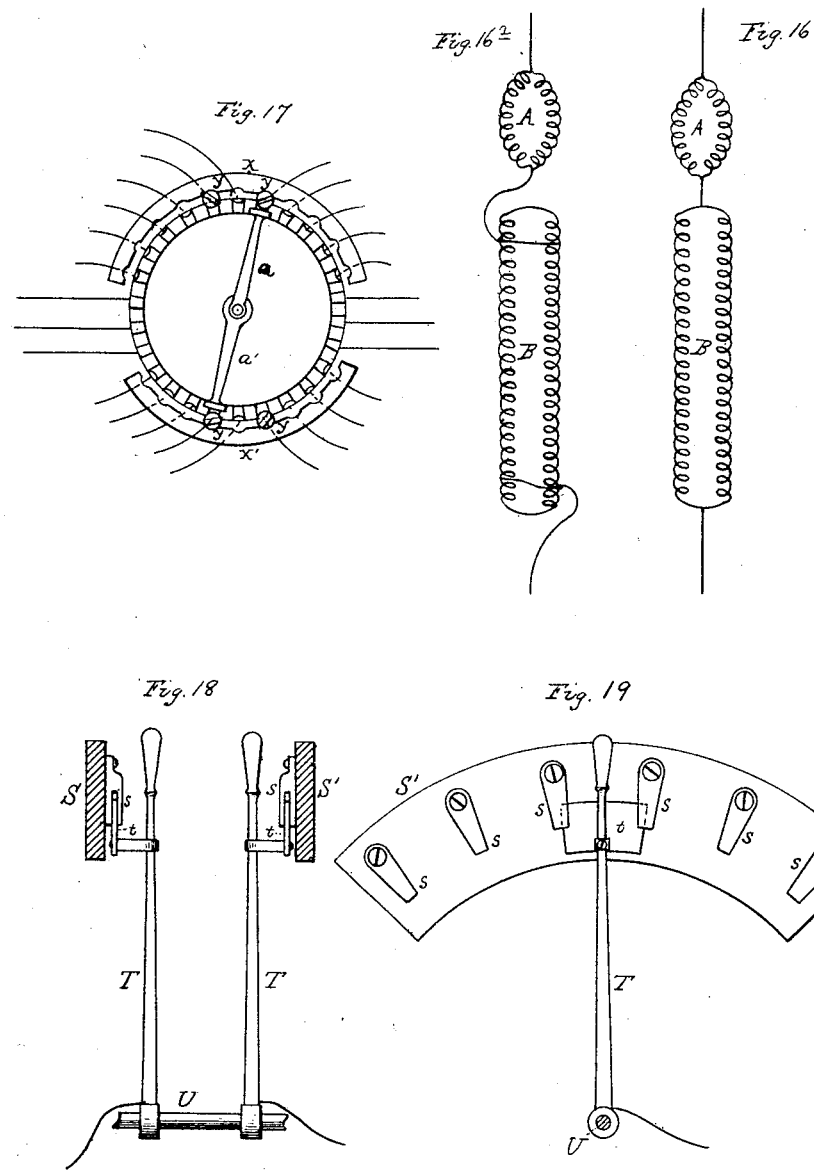

(No Model.)
8 Sheets—Sheet 8.
F. J. SPRAGUE.
ELECTRO DYNAMIC MOTOR.
No. 315,180.　　　　　　　　　　　Patented Apr. 7, 1885.
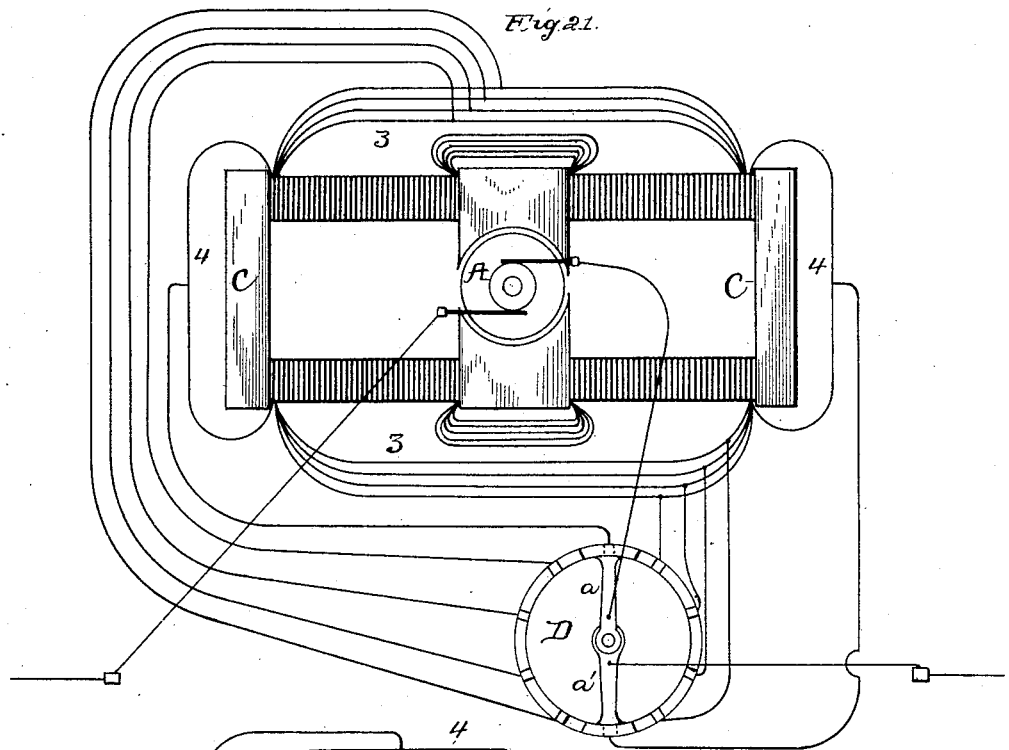
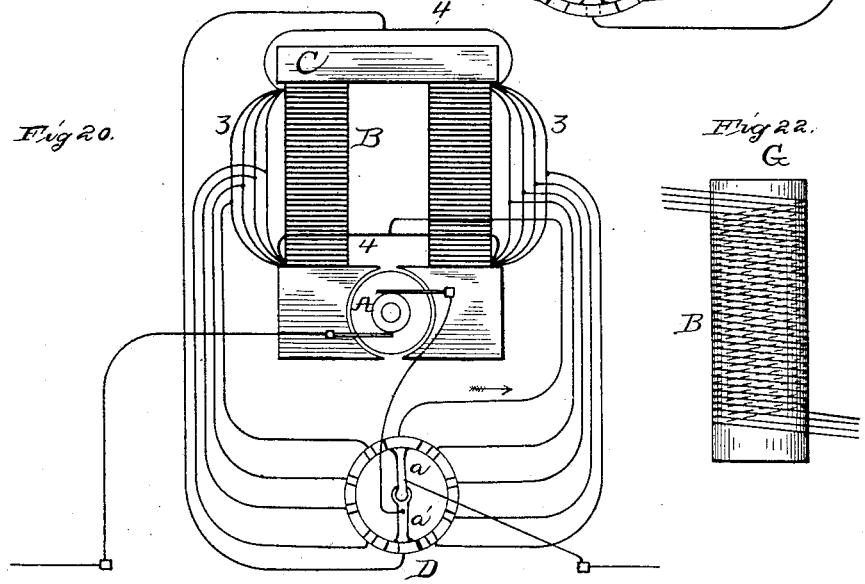
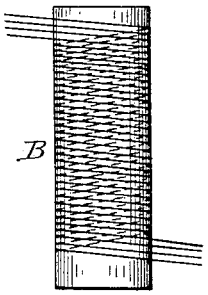
ATTEST:　　　　　　　　　　　　　　INVENTOR:

United States Patent Office.

FRANK J. SPRAGUE, OF NEW YORK, N. Y.

ELECTRO-DYNAMIC MOTOR.

SPECIFICATION forming part of Letters Patent No. 315,180, dated April 7, 1885.

Application filed June 9, 1884. (No model.)

*To all whom it may concern:*

Be it known that I, FRANK J. SPRAGUE, of New York, in the county and State of New York, have invented a certain new and useful Improvement in Electro-Dynamic Motors, of which the following is a specification.

This invention relates to a new method of regulation for electro-dynamic motors, whereby the power and speed and direction of rotation of a motor may be varied at will, either by hand or automatically, and with great exactness and precision; or the motor may be made to run at one or another determined constant speed with a constant current or constant potential, under varying loads; or the power may be maintained constant at different speeds.

The main feature of my invention is the use of a continuous field-circuit, wound in a manner to be presently described, in connection with means for changing the connection of the terminals of the supplying-circuit from one part of such field-circuit to another, whereby I am enabled to vary the effective magnetic moment of the field-coils in any desired progression and direction. The field-coils are wound sectionally in layers, the coils of each section of a series being wound upon the whole length of the core, or of that portion of the core which is inclosed by the series, and the sections are connected together so as to form a continuous and unbroken series of coils. Connections from the bights of these coils are brought to suitable contact-blocks, on which travel arms which form the inlet and exit terminals of the supplying-circuit. By shifting these arms the current may be made to enter and leave the field-sections at any desired points, whereby the current may be reversed in any desired number of sections, while remaining direct in others, and any magnetic effect or moment up to the maximum of either polarity may be obtained at will.

I would here state that I am aware that in British Patent of Deprez, No. 3,074 of 1883, a closed field-circuit with movable supplying-terminals is set forth. Deprez's arrangement is totally distinct from mine, however, as I will explain.

In Deprez the sections are wound side by side upon the core, and the reversing of the current in a section changes the polarity of that particular part of the core inclosed by that section. By reversing the sections successively the position of the magnetic poles is changed, and thus the effect on the armature is varied. This is fully set forth in the patent. In my invention, however, each section affects all that part of the core inclosed by the series, and the reversing of current in the sections, instead of shifting the poles, changes the magnetic condition of the whole core.

In regulating the field according to my invention there is no material change in the resistance of the field-circuit, which is a closed circuit, offering two paths to the passage of the current, and there is no breaking of the circuit.

It is evident that I can use the closed field-circuit in parallel circuit or in series with the armature of a motor; or I can use two such field-circuits in a differential motor, one being a shunt to the armature alone or to the armature and the other field-circuit; or I may use the continuous closed field-circuit as the shunt field-circuit of a compound motor in connection with an ordinary series field-circuit. The resultant action in the motor is not the same in all these cases, and it is different in any one form, according to whether the motor is used on a circuit of constant potential or of constant current.

Since with a constant current the speed and power of a given motor depend upon the strength of the field, and its direction of rotation upon the polarity of the field, I can by the use of my invention vary the speed and power as desired from zero to maximum, or reverse the motor at will, or by suitable automatic devices maintain a constant speed under varying loads. I can also develop a given power under different speeds.

With constant potential circuits it is evident from what I have set forth in my applications Serial Nos. 121,487 and 129,892 that I can, by the means above described, vary the speed, power, and direction of rotation of a motor, or automatically maintain constant speed under varying loads. I can also work at different speeds under the same load.

My invention is particularly effective in regulating the speed and power of differential wound motors having two sets of field-coils, one in series, the other in shunt relation with the armature, designed to work with a constant potential or a constant current, and to maintain a constant speed under varying loads without any automatic shifting of contacts, but by an electrically-automatic regulation of the field strength due to its particular winding.

I have discovered certain proportions which must exist in the electrical and mechanical relations of such motors to get the best results, which are set forth in my applications Serial Nos. 138,146 and 138,147, and by the means herein set forth I can vary such relation at will, so as to maintain whatsoever ratio I may desire.

I am enabled to construct a motor, whether for a constant current or a constant potential, which I can set to run at certain predetermined constant speeds under varying loads.

The same principles are applicable to generators designed to furnish a constant current or a constant potential, and I shall fully set forth their character in the intended application just referred to.

In the differential form of motor the magnetic field is due to the difference in the effective ampère-turns of the shunt and the series sets of field-coils, the former predominating and the latter being differential. The shunt may be to the armature alone, or to both armature and series field sets, and in one form of motor I provide means for shifting one of the supplying-terminals of the shunt-circuit inside or outside the main field-circuit terminals.

It is evident that if I have any ratio existing between the effective ampère-turns in the two sets of field-coils I can, by employing the method of regulation above set forth, alter the total of such effective ampère-turns, while maintaining their ratio constant; or I can change the ratio without changing the total; or I can change both the total and the ratio. This power of variation in a differential motor I consider of the utmost importance.

While I can effect the above changes without any change in the resistances of the series and shunt field-coils, I also wish to be able to vary the resistance of either, and at the same time retain the power of varying the effective ampère-turns. I do this by short-circuiting a greater or less part of the closed field-circuit.

Another feature of my invention relates to the use of the closed field with movable supplying-circuit terminals and movable armature-circuit terminals.

With the supply-circuit terminals in position so that the magnetic moment of all the coils is similar, a shifting of the armature-terminals will vary the potential existing at these terminals from maximum to zero and from zero to the reverse maximum, as explained in my Patent No. 295,454. No matter where the supplying-terminals are, however, it is evident that the armature-terminals may be reduced from maximum to zero potential and the reverse by shifting the terminals from the line-terminal contacts to positions electrically equidistant from these. Also, with any fixed position of the armature-circuit terminals, like changes of potential may be made to take place by shifting the supply-terminals. One peculiarity must be noticed: If the supply-terminals are shifted into any other than what may be called the "normal" position, there is a differential magnetic moment, and the field may be weakened to zero, and then reversed, and if the armature be in a certain position removed from the position of maximum and zero polarity for its brushes with any particular differential position of the supply-terminals, we have a motor with a new arrangement of circuits—namely, two series differential field-coils, the armature between the two, and two sets of shunt field-coils, one of which is in shunt to the armature, and one series differential field set, and the other in a shunt to the armature and the other series differential field. If the armature-circuit terminals be now moved, certain direct coils may be added to the series differential without changing the general arrangement of the series and shunt circuits with regard to each other and the armature, so that the differential effect may be increased or lessened, or made to entirely disappear. The reversal of armature or field, or both, the weakening and strengthening of the field, and high and low speeds and power are thus obtained with great celerity. The armature-terminals being movable upon the field-coils, I am enabled, further, by shifting one or both of such terminals, to introduce the armature gradually into circuit.

Another part of my invention relates to means for gradually introducing the resistance of the field-coils of a series or shunt-wound motor into circuit, while maintaining a zero field. The line-terminals being separately movable, it is evident that if they are both connected at the same point of the continuous closed field-circuit there will be no field-resistance and no magnetizing effect. If they are moved away from each other, each being moved over the same number of contacts, portions of the field-resistance will be placed in circuit, but the current flows equally in both directions through such portions, and there is still no effect on the core. The terminals may thus be shifted until the full resistance of the field is in circuit, while the field-magnet still remains entirely quiescent. If the terminals are then moved in the same direction around the circuit, the direction of the current is changed in some of the coils, remaining the same in the others, as previously explained, and so any magnetic effect is reached without changing the resistance.

It is evident that the foregoing methods of field-regulation are also highly effective when used with dynamo-electric generators.

The mode of winding the sectional field which I prefer is to take several strands of wire and wind them together in one layer from one end of the core to the other. Each strand forms one section, and similar layers of sections are wound successively upon the core, an end of each strand being connected to that of the next, so that a continuous series is formed, and from between the sections connections are made to the contact-blocks of the adjusting-commutator.

In the accompanying drawings, Figures 1 to 1$^c$ are diagrams illustrating the most simple application of my invention to a shunt-wound motor. Figs. 2 to 2$^c$ show the simple application to a series motor. Figs. 3 and 3$^a$ are diagrams of a differential motor with series coil inside the terminals of the armature-shunt; Figs. 4 and 4$^a$, diagrams of a differential motor with series coil outside the armature-shunt terminals; Fig. 5, a diagram of a differential motor having a switch for changing the connection of the differential coil; Fig. 6, a view of the same motor with its switch; Figs. 7 to 7$^b$, diagrams illustrating the gradual throwing in of the field-resistance in a shunt-wound motor. Figs. 8 to 8$^b$ show the same in a series motor. Figs. 9 to 9$^g$ are diagrams illustrating a different way of connecting the continuous closed field-circuit, whereby all the different changes may be most conveniently made. Fig. 10 is a diagrammatic view of the motor wound in this way, with the field-commutator shown diagrammatically. Figs. 11 to 11$^c$ illustrate one mode of gradually throwing in the armature. Figs. 12 to 12$^f$ illustrate another mode of varying the armature-current. Figs. 13, 14, and 15 illustrate different automatic methods of regulation embodying my invention. Figs. 16 and 16$^a$ are diagrams illustrating the short-circuiting of part of the closed field-circuit. Fig. 17 represents a commutator for this purpose. Fig. 18 is a vertical transverse section of a commutator which I employ in some cases; Fig. 19, a vertical longitudinal section of the same. Figs. 20 and 21 are views of motors embodying my invention, and Fig. 22 illustrates the preferred mode of field-winding.

Like letters refer to corresponding parts in all these figures.

In the motor diagrams a contiguous sectional winding is shown, the sections being arranged longitudinally with relation to one another; but it is to be clearly understood that the actual winding of the sections is in layer form, and each section extends the full length of the core.

The diagrams are simply for clearness of explanation.

A is the motor-armature; B, the main or regular field-coils, and 1 2 are the terminals of the supplying-circuit for the field. These may be terminals of a derived or multiple-arc circuit, or of the direct main conductor. In all cases the direction of the current is indicated by the arrows.

Referring, first, to Figs. 1 to 1$^c$, the armature-coils A are in shunt relation to the field-coils B. It will be seen that such field-coils are arranged in a single continuous closed circuit.

In Fig. 1 the terminals are connected at such parts of this circuit that the current has two paths in the same direction, the whole current acts to magnetize the cores directly, and the resistance of the circuit is that of these two parallel or multiple-arc paths; but if the terminals are shifted to the position seen in Fig. 1$^a$ it is evident that the current is reversed in part of the coils, as indicated by the arrows, while it remains the same in the rest, and consequently the field is weakened, while the current has still two paths of the same resistance as before. Now, if the movement is still continued, when the terminals reach the position shown in Fig. 1$^b$, the coils in which current is reversed are equal to the direct coils; hence the opposing magnetizing effects are equal and the field strength is at zero. A further shifting, as shown in Fig. 1$^c$, reverses the current in a still greater number of coils, the reverse effect predominates over the direct, and the polarity of the field and direction of rotation of the motor are changed. Shifting to the position in 1$^d$ reverses the whole field and gives the maximum reverse strength. It will be seen that all these changes have been effected without any change in the resistance of the field, and with no change in the direction of the armature-current.

As set forth in my application No. 121,487, I weaken the field to produce an increase in speed or power and strengthen it to produce a decrease, if working on a circuit of constant potential.

Fig. 1$^c$ shows the motor with commutator and connections for accomplishing the field-regulation just described. The field-magnet C is wound in sections, all the sections being connected in a continuous closed circuit, and each section has a connection to a contact-block of the circular commutator D, on which bear two pivoted arms, $a$ $a'$, each forming a terminal of the supplying-circuit. By moving these arms into contact with the different blocks the line-connections are changed from one part of the field-coils to another, and the changes above described are produced.

Figs. 2 to 2$^d$ show a motor with the armature and field coils in series. The connections of the field-coils are changed to vary the strength of the field-magnet in the manner above set forth, and as indicated by the arrows. In this motor the reversal of motion can be accomplished by reversing the field, either with a constant-potential or constant-current circuit.

Fig. 2$^c$ represents the series motor, the connection from the arm $a'$ being to a commutator-brush, thus bringing both armature and field coils into the direct circuit.

Referring to Figs. 3 and 3$^a$, E is a set of differentially-wound field-coils in the armature-shunt.

In Fig. 3 the full number of regular field-coils B are in direct circuit, and also the full number of opposing coils E. There is thus a magnetizing effect and a field strength due to the number of turns in coils B multiplied by the ampères of current in the field-shunt, less the number in coils E multiplied by the ampères in the armature-shunt, and the motor runs at a certain speed; but in Fig. 3ª the terminals are changed so as to reverse the current in some of the direct field-turns and in a different number of the opposing field-turns. The relation of the ampère-turns is therefore changed, and a different magnetizing effect is produced and a different speed, there being a constant potential at the armature-shunt terminals or a constant current on the line. Now, as either the direct or the opposing field-magnetism may be varied to any desired extent, it is evident that this gives a great range of field variation, each different relation of the ampère-turns having its particular effect on the cores. Further, I can readily alter the total number of effective ampère-turns without altering their ratio by changing the direct and differential field-coils to the same extent; or I can change both the total and relative numbers, if desired.

In Figs. 4 and 4ª the differential coils E are outside the terminals of the armature-shunt.

Fig. 5 illustrates the differential motor provided with a switch for changing the connections of the differential coil to either side of the armature-shunt terminal. The connection is changed at switch $b$, and the dotted lines indicate the changing of terminals from one part of the closed field-circuit to another.

Fig. 6 is a view of the differential motor. In addition to commutator D, to which the main field-sections are connected, as already explained, a commutator, F is provided, to which the differential coils E are similarly connected. By throwing switch $b$ to the right the differential coils are placed outside of the armature-shunt terminals, and throwing the switch to the left places said coils within the shunt.

In Figs. 7 to 7ᵇ the gradual throwing in of the field-coils is illustrated in a shunt motor, and in Figs. 8 to 8ᵇ in a series motor.

In the position shown in Figs. 7 and 8 it will be seen that the field-coils are entirely cut out of circuit and the field strength is zero. Shifting the terminals equal distances along the parallel sides of the field to the positions shown in 7ª and 8ª, a certain resistance is thus in circuit; but the reverse flow is equal to the direct, and the field strength is still zero. At the positions of 7ᵇ and 8ᵇ the whole resistance of the field is in circuit; but the direct and reverse effects are still equal and the field strength still zero. Thus the resistance of the field-circuit has been gradually introduced, while the magnet has remained perfectly inactive. This is of great value in series systems, where the sudden throwing in of the whole field-circuit resistance would produce an effect which might not be instantaneously compensated for in the generator. After the full resistance is introduced the strength of the field may be gradually brought up to the desired point. This feature is further illustrated in Figs. 9 to 9ᵍ, in which the continuous closed field-circuit is connected in such a way that all the operations of changing its resistance without changing its magnetizing effect and of changing its magnetizing effect without affecting its resistance may be most readily performed. Here the two parallel ranges of sections are connected diagonally from one end of each to the farther end of the other, and the two ranges are wound or connected to oppose each other.

At the position of the terminals seen in Fig. 9, such terminals are close together electrically, the field-coils are all short-circuited, and the field-magnet has no resistance and no magnetic strength. On shifting the terminals, as in 9ª, portions of the field-coils are brought into circuit, forming two paths for the current, one of which is of low resistance; but those coils in which current is reversed equal those in which it is direct—the coils being oppositely wound—and thus while the resistance is increased the magnetic effect is still zero. In Fig. 9ᵇ the full resistance is in circuit, there being two paths of equal resistance; but the direct and reverse coils are still equal and the field still zero. Having now the full resistance in circuit, by shifting the terminals, as at 9ᶜ, the positively-acting coils predominate over the negative, though the two paths are still of equal resistance and the field is of a certain strength. In 9ᵈ all the coils act directly and the field has its full strength, the resistance remaining the same. In 9ᵉ the reversely-acting coils exceed the direct coils, and the direction of rotation is changed. In 9ᶠ the field has its full reverse strength, the resistance of the coils being still unchanged. Fig. 9ᵍ illustrates these adjustments. The field-coils have sectional connections, as shown. The ends of contact-arms forming line-terminals, and movable singly or together, are represented by $l\ l'$. At the position shown the effect is the same as in 9ᵇ; and it is evident that by the movement of the contact-arms any of the other effects above described may be produced. This form of connection is of course as well applicable to shunt-wound as to series motors.

Fig. 10 is a view of the motor connected as just described. One diagonal connection of the commutator-blocks is through wires 5 and 6, the other through wire 7. Arms $l\ l'$ are moved to change the connections, as above explained. As shown, there is nearly the full field strength with the full resistance in circuit.

A mode of throwing the armature gradually into circuit is shown in Figs. 11 to 11ᵇ in a compound motor having differential coils E in the armature-shunt. In Fig. 11 the armature is shunted around only a small part of the field-coils, and in Fig. 11ª one terminal of the shunt is shifted so as to shunt around all of them. It is evident that the armature may then be placed in circuit with a very weak current, and the current then gradually increased to the maximum or to any desired intermediate point.

In 11[b] is shown the armature shunted around the full field, but with the direct and differential field-terminals shifted to vary the field strength.

Fig. 11[c] shows a simple shunt-wound motor, with a commutator adapted to produce the effects just described upon the armature and main field-coils. An extra arm, $c$, forming one terminal of the armature-shunt, travels upon the contact-blocks of commutator D, and the connection from arm $a'$ extends to contact-block $d$, and thence to the supplying-circuit. Otherwise this commutator is the same as that in Fig. 1[c]. When arm $c$ is on block $d$, the armature is shunted around all the field-coils; but in the position shown it is shunted on only a part thereof.

In Figs. 12 to 12[e] is illustrated an arrangement whereby the simple shunt motor may be made a differential one with negative field-coils in series with the armature, and the relation between the shunt and series field-coil set may be changed to produce different magnetizing effects, as has been hereinbefore explained.

In Fig. 12 there is a full set of direct field-coils in circuit, and the armature-terminals are connected at opposite points of the continuous circuit. There would thus be the same potential at both terminals of the armature-shunt, and consequently no current in the armature.

In 12[a] both terminals are shifted to other than opposite points, and a portion of the current passes through the armature. Here it will be seen that parts of the field-circuit are in series with the armature, the whole field effect being still a direct one.

In 12[b] there is a zero field with no current in the armature, and in 12[c] the shifting of the armature-terminals, by changing the resistance of the different paths for the current, makes a weak field and allows a certain current to traverse the armature-shunt. It will be seen that the armature may thus be thrown in upon a full field or a zero or any intermediate field.

In Figs. 12[d] and 12[e] is illustrated more explicitly the changing of the simple motor into a differential motor. By shifting the armature and supplying terminals to the positions in Fig. 12[d], it is evident that there are two sets of reversed coils in series with the armature and outside the terminals of the armature-shunt, and two sets of direct coils in shunt each to the armature and one series field-coil. By shifting armature-terminals as in 12[e], certain direct coils are added to the differential coils in series with the armature, whereby the differential effect is weakened; and it is evident that by shifting armature and supply terminals any desired relation and magnetic effect may be produced. These features have already been fully explained.

In Fig. 12[f] is illustrated the means for producing these changes. By shifting arms $f f'$, parts of which are broken away in the drawings for clearness, the armature-terminals are connected to any desired points of the closed field-circuit.

Fig. 13 illustrates an automatic regulating device for a motor. An adjustable centrifugal governor, $m$, is placed upon or connected with the shaft of the motor, so as to be affected by variations in speed. The moving portion of the governor carries the contact-arms $n\ n'$, placed between contact-arms $o\ o'\ o^2$. Arms $n\ n'$ are insulated from each other, and wires extend from them, respectively, to the commutator-brushes of a small electro-dynamic motor, M. The armature-shaft of this motor is connected by any suitable gearing with the contact-arms $a\ a'$ of commutator D. The connection shown is by suitable belts and pulleys, so that the speed of the motor is reduced at the commutator-arms. This form of gearing is shown for illustration only, for other forms of slowing-down gearing may be found preferable in practice. An increase of speed raises the governor-balls and closes circuit through motor M in such direction as to move arms $a\ a'$ to properly regulate the field, and a decrease in speed moves motor M in the opposite direction. At the normal speed the circuit is open at $n\ o$. Current is supplied to motor M from any desired source. As shown, a shunt, 9 10, from the field-circuit leads to contacts $o\ o'\ o^2$.

Figs. 14 and 15 show automatic regulators for generators. In Fig. 14 the circuit-reverser $o\ n$ for motor M is controlled by magnet N, placed in a shunt around the armature. This is for a constant-potential generator. A decrease of electro-motive force causes magnet N to close circuit to motor M, so as to move the commutator-arms to strengthen the field, and an increased electro-motive force produces an opposite effect.

Fig. 15 shows a constant-current generator, magnet N being directly in the line and acting oppositely upon the field to that in Fig. 14. In some cases these last-described automatic regulators are applicable also to motors.

Figs. 16 and 16[a] show the short-circuiting of part of the field-coils to change the resistance of the field-circuit. In Fig. 16 the full field is in circuit, and in 16[a] portions of it are short-circuited. It is evident that all the regulating operations may be readily performed upon the partially short-circuited field. A commutator for accomplishing this is shown in Fig. 17.

In addition to the contact-blocks to which the field-connections are brought, as shown, and on which the arms $a\ a'$ travel, there are two arcs, $x$ and $x'$, to which the blocks may be connected by the insertion of plugs $y$. Thus any two blocks may be connected with the arc with the effect of short-circuiting the sections between those with which they are connected.

The construction of the commutator which I prefer to use in connection with the arrangement shown in Figs. 9, 10 is illustrated in Figs. 18 and 19.

S and S' are arcs of insulating material, upon the opposing faces of which are ranges of contacts *s s*. These are split contacts, which are entered by wedges *t t*, carried by arms T T. These arms are carried by the same shaft, U, and to each extends one of the circuit-wires. Each contact *s* is connected at a different point to the field-coils, and thus by moving arms T the circuit-connections are shifted to such different points.

Thus far in all the diagrams I have shown the sections as wound side by side on the cores, although, as stated, this is only for illustration, the sections being wound longitudinally in practice. I have, however, illustrated the longitudinal winding in Figs. 20 and 21.

Fig. 20 is a motor with a single magnet, C. Each section is wound the whole length of the core, the ends of successive sections being joined by wires 3 3, and the series on opposite limbs of the magnet being joined together by wires 4 4 to make a continuous series. Connections are brought from between the sections to the commutator D, and the latter is manipulated in the manner already explained.

The motor in Fig. 21 has a double field-magnet, and the connections are made as just explained, all the coils of the double magnet being in the continuous series.

The manner in which I prefer to wind the field is to take several wires—four being shown in Fig. 22—and wind them all in a layer, covering the whole core G. Other layers are similarly wound upon this inner one. Each wire wound from end to end of the core forms a section of the field, and the sections are all connected as shown in the preceding figures. In a differential motor I prefer to wind the differential coils also along the whole length of the core, together with the main coils.

I do not claim herein two sets of field-coils both in series with the armature and outside the terminals of the armature-shunt, since this will be claimed in another application; neither do I claim herein the automatic regulators for generators in which a change of current or electro-motive force causes the shifting of the field-circuit terminals upon the field-coils, so as to regulate the current generated.

What I claim is—

1. The combination, in an electric motor or generator, of a series of sections of field-coils connected together in a continuous closed circuit, each section being wound from end to end of that portion of the core inclosed by the series, and means for reversing the current in more or less of said coils, substantially as set forth.

2. The combination, in an electric motor or generator, of a series of sections of field-coils connected together in a continuous closed circuit, and each section wound from end to end of that portion of the core inclosed by the series, and means for changing the connections of the supplying-circuit from one section to another of the series, substantially as set forth.

3. The combination of a series of field-magnet wires, each wound from end to end of a core, and all connected together to form a continuous circuit, connections from the ends of the wires to suitable contacts, and terminals of the supplying-circuit movable upon said contacts, substantially as set forth.

4. An electro-dynamic motor having field-coils in shunt relation to its armature, said field-coils being in a continuous constantly-closed circuit, as described, in combination with means for changing the terminals of the supplying-circuit to different points of said field-coils, substantially as set forth.

5. The combination, in an electro-dynamic motor, of the armature, main field-coils in shunt relation to the armature, differential field-coils in series with the armature, and means for varying the relation between the number of effective ampère-turns of the shunt field and the number of the series field, substantially as set forth.

6. The combination, in an electro-dynamic motor, of the armature, main field-coils in shunt relation to the armature, differential field-coils in series both with the armature and the main field-coils, and means for varying the relation between the number of effective ampère-turns in the shunt coil and the number in the series coil, substantially as set forth.

7. The combination, in an electro-dynamic motor, of the armature, main field-coils in shunt relation to said armature and differential field-coils in series with said armature, and means for varying the total number of effective ampère-turns in the field-coils without changing the relation between the direct and differential turns, substantially as set forth.

8. The combination, in an electro-d motor, of the armature, main field-c shunt relation to the armature and differential coils in series with the armature, and means for varying the total number of effective ampère-turns in the field-coils and the relation between the direct and differential ampère-turns, substantially as set forth.

9. The combination, in an electro-dynamic motor, of the armature, main field-coils in shunt relation to the armature, differential field-coils in series with the armature, means for reversing the current in more or less of the main field-coils, and means for reversing the current in more or less of the differential field-coils, substantially as set forth.

10. The combination, in an electro-dynamic motor, of the armature, main field-coils in shunt relation to the armature and in a continuous constantly-closed circuit, differential field-coils in series with the armature, also in a continuous constantly-closed circuit, means for shifting the supplying-terminals to different parts of the main field-coil circuit, and means for shifting the supplying-terminals to different parts of the differential field-coil circuit, substantially as set forth.

11. The combination, with an electro-dynamic motor having main field-coils in shunt relation to the armature, and differential field-coils in series with the armature, of a switch for shifting one terminal of said shunt coils to inside or outside the said differential coil, substantially as set forth.

12. The combination, with the field-magnet of an electro-dynamic motor having its coils in a continuous closed circuit, of connections from different parts of said coils to contact-blocks, and independently-movable arms forming circuit-terminals adjustable upon said contact-blocks, substantially as set forth.

13. The combination, with two parallel ranges of field-magnet coils, of connections from each end of a range to the farther end of the other range, substantially as set forth.

14. The combination, in an electro-dynamic motor, of field-coils in a continuous closed circuit, means for shifting the terminals of the supplying-circuit to different points of said field-coils, and means for varying the armature-current, substantially as set forth.

15. The combination, in an electro-dynamic motor, of field-coils in a continuous closed circuit, means for shifting the terminals of the supplying-circuit to different points of said field-coils, and means for shifting one or both terminals of the armature-shunt to different parts of said field-coil, substantially as set forth.

16. The combination, in an electro-dynamic motor, of field-coils in a continuous closed circuit, means for shifting the terminals of the supplying-circuit to different points of said field-coils, and means for varying the relation between the number of field-coils around which the armature is shunted and the number with which it is in series, substantially as set forth.

17. The combination, in an electro-dynamic motor, with sectional field-coils in a continuous closed circuit, of connections from the sections to blocks of a commutator, two arms upon said commutator, connected with the supplying-circuit terminals, and one or two arms connected with one or both terminals of the armature-shunt, substantially as set forth.

18. The combination, with an electro-dynamic motor having field-coils in a continuous closed circuit, a commutator, connections to said commutator from different parts of said closed field-circuit, supplying-terminals movable upon said commutator, and a speed-governor connected with the motor for moving said terminals, substantially as set forth.

19. A field-magnet whose coils are wound in two or more layers, each comprising two or more strands of wire, each strand being wound from end to end of the core, or of a definite portion of the core, and all said strands being connected together in a continuous series, substantially as set forth.

This specification signed and witnessed this 23d day of May, 1884.

FRANK J. SPRAGUE.

Witnesses:
H. W. SEELY,
T. G. GREENE, Jr.